April 10, 1956 A. C. PATCH 2,741,064
MOUSE TRAP
Filed Feb. 6, 1953
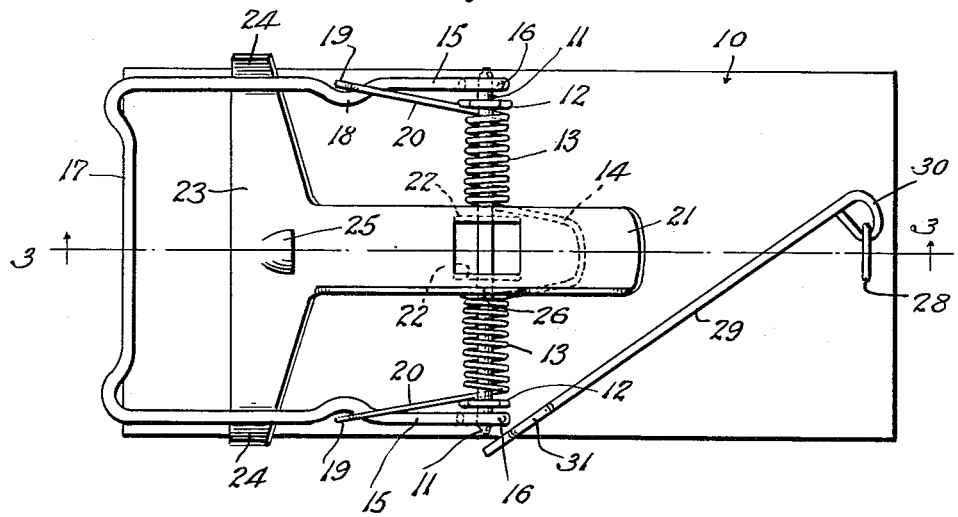
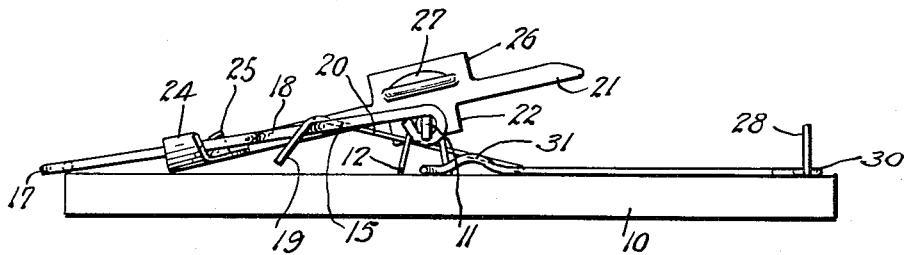
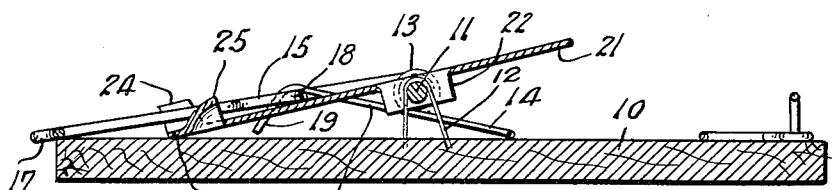
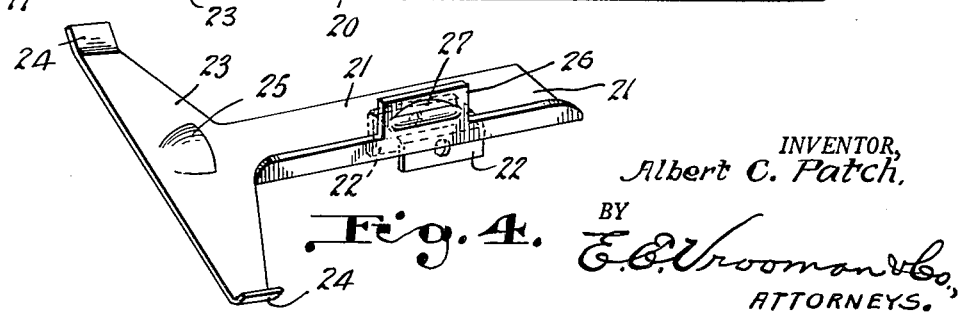
INVENTOR,
Albert C. Patch.
BY
E. E. Vrooman & Co.,
ATTORNEYS.

United States Patent Office 2,741,064
Patented Apr. 10, 1956

2,741,064
MOUSE TRAP

Albert C. Patch, Topeka, Kans.

Application February 6, 1953, Serial No. 335,427

1 Claim. (Cl. 43—81)

This invention relates to mouse and rat traps and has special reference to a spring actuated killing trap.

In traps of this character there is generally provided a base whereon is mounted a spring actuated member in the form of a wire loop designed to grip the neck of the animal between the base and the loop, the trap being provided with means of novel character for holding the spring-actuated member in open and spring tensioned position.

In the present invention, one object of the invention is to provide a novel means for holding the killing loop against the action of the spring.

Another object of this invention is to provide a mouse-trap with a T-shaped member including upturned ends, and between said ends is a bait-holding prong.

An important object of the invention is to provide novel means for preventing lateral swinging movement of the wire loop when the trap has been sprung.

With the above and other objects in view, the invention consists in general of certain novel details of construction and combinations of parts hereinafter fully described, illustrated in the accompanying drawings, and particularly claimed.

In the accompanying drawings, like characters of reference indicate like parts, and:

Fig. 1 is a plan view of the improved mouse and rat trap in a sprung position.

Fig. 2 is a side elevation thereof showing the position assumed by the parts after the trap has been sprung.

Fig. 3 is a section on the line 3—3 of Fig. 1, and looking in the direction of the arrows.

Fig. 4 is a fragmentary view showing a portion of the means for restraining the trap from being sprung.

In the embodiment of the invention as here shown, there is provided a flat rectangular base 10, which may be made of wood, or any other suitable material. Extending diametrically across this base intermediate its ends is a shaft 11, supported above the base by the eyes 12. Between the eyes 12 and the central portions of the shaft are wound springs 13 of the tortional type and the proximal ends of these springs are connected by a loop arm 14, resting on the base 10, Fig. 3. On the shaft 11 adjacent its ends there is secured a striking loop having arms 15 provided with eyes 16 rotatably mounting the arms 15 on the shaft. These arms 15 have their outer ends connected by a cross arm 17 extending transversely of the base. Each of the arms 15 has an inwardly bent portion 18 and in these bent portions are positioned the extremities 19 of arms 20 leading from the ends of the springs 13 and urging the looped portion 17 toward the forward end of the trap.

The bait carrier comprises a longitudinal portion 21 from the sides of which project downwardly-extending fins 22 through which passes the shaft 11. At the free end of the member 21 there is provided a cross member 23 having unturned ends 24, wherein the arms 15 engage when the trap is sprung as shown in Figs. 1, 2, and 3. The cross member 23 and the portion 21 define the respective head portion and stem portion of a T-member illustrated in Fig. 4. A suitable bait holding prong 25 is formed on this member at the central portion of the head of the T. Extending upwardly from one edge of the portion 21 is a plate member 26 having a recess 27 therein.

Near one end of the body there is provided an eye or staple 28 and this staple is mounted on a latch arm 29 having an eye 30 for engaging on the staple. Adjacent its free end this latch arm 29 is provided with a curved offset portion 31.

In order to set the trap, the killing loop is turned towards the rear of the base carrying eye 28 and the T-member is tilted so that the head portion is slightly elevated. Then the latch arm is brought over the stem 21 of the T-member and the loop 31 is engaged in the recess 27. The latch arm 29 extends under these conditions over the portion 17 of the killing loop and the loop is there held. When the animal attacks the bait, the T-member has its forward end depressed, which will free the latch member and permit the killing loop to spring over as shown in the drawings, thus catching the mouse or rat between the part 17 and the base.

The upturned ends 24 of the bait-carrier keep the arms 15 snugly in place. Upon referring to Figs. 1 and 2, it will readily be seen that said arms rest in a nested position between said arms 24. When the trap is set the loop 31 is moved horizontally into the recess 21, whereby the striking loop is retained securely until the bait is attacked by the animal.

For further information as to the striking loop 15, 17, being retained in the set position by the latch arm 29 and parts 26, 27, reference may be had to Stilson patent, No. 2,103,977, Fig. 1.

What is claimed, is:

In a trap of the class described, the combination with an elongated rectangular base, of a shaft supported on a side of the base, transversely thereof and intermediate the ends of said base, a striking loop comprising a transverse portion, and a pair of laterally spaced apart arms extending longitudinally from the ends of said transverse portion said arms being journalled at the respective ends thereof remote from said transverse portion on the respective end portions of said shaft for swinging movement thereabout, resilient means urging said loop about said shaft from a set position adjacent said base on one side of said shaft to an animal trapping position adjacent said base on the opposite side of said shaft, a T-shaped bait-carrying member including a stem portion extending longitudinally of said base, said stem portion being tiltably mounted on said shaft and extending transversely over said shaft and having a finger-piece, at one end thereof, and having depending eye portions extending below the lower side portions of said stem portion for providing a tiltable mounting on said shaft, said member also including a head portion on the opposite end thereof extending transversely of said base and said stem portion, said head portion being provided with upturned ends between which said arms of said loop are adapted to be engaged, said head portion having means for securing bait thereon, a latch member pivotally connected on said base adjacent one end thereof on said one side of said shaft and adapted to releasably engage over said transverse portion of said loop, and releasable interlocking means between said stem portion and said latch member for releasably holding said loop in set position.

References Cited in the file of this patent

UNITED STATES PATENTS

| | | |
|---|---|---|
| 1,405,229 | Kopke | Jan. 31, 1922 |
| 1,491,829 | Stoeffler | Apr. 29, 1924 |
| 2,052,345 | Garling | Aug. 25, 1936 |
| 2,087,440 | Merz | July 20, 1937 |
| 2,103,877 | Stilson | Dec. 28, 1937 |
| 2,144,956 | Arndt | Jan. 24, 1939 |
| 2,263,560 | Barrows | Nov. 25, 1941 |

FOREIGN PATENTS

| | | |
|---|---|---|
| 222,272 | Great Britain | Oct. 2, 1924 |
| 319,681 | France | July 29, 1902 |